(12) United States Patent
Rothoff et al.

(10) Patent No.: US 8,978,859 B2
(45) Date of Patent: Mar. 17, 2015

(54) FLUID CLUTCH DEVICE

(75) Inventors: Andreas Rothoff, Markdorf (DE);
Frank M. Haase, Markdorf (DE)

(73) Assignee: BorgWarner Inc., Auburn Hills, MI (US)

( * ) Notice: Subject to any disclaimer, the term of this patent is extended or adjusted under 35 U.S.C. 154(b) by 460 days.

(21) Appl. No.: 13/379,692

(22) PCT Filed: Jul. 2, 2010

(86) PCT No.: PCT/US2010/040862
§ 371 (c)(1),
(2), (4) Date: Dec. 21, 2011

(87) PCT Pub. No.: WO2011/005677
PCT Pub. Date: Jan. 13, 2011

(65) Prior Publication Data
US 2012/0090949 A1    Apr. 19, 2012

(30) Foreign Application Priority Data
Jul. 9, 2009 (DE) .......................... 10 2009 032 440

(51) Int. Cl.
*F16D 35/00*    (2006.01)
*F16D 35/02*    (2006.01)

(52) U.S. Cl.
CPC ................ *F16D 35/00* (2013.01); *F16D 35/02* (2013.01); *F16D 2300/26* (2013.01)
USPC ................ 192/113.24; 192/112; 192/58.2; 416/169 A

(58) Field of Classification Search
CPC ... F16H 39/00; F16H 2041/243; F16H 41/28; F16H 41/00; F16D 33/00; F16D 33/20; F16D 33/18
USPC ......... 192/58.4, 58.682, 112, 113.25, 113.24, 192/58.2; 123/41; 416/169 A, 169 R
See application file for complete search history.

(56) References Cited

U.S. PATENT DOCUMENTS 6,530,748 B2 * 3/2003 Light et al. ................ 416/169 A

FOREIGN PATENT DOCUMENTS

KR    10-2009-0059482    *   6/2009

OTHER PUBLICATIONS

KR 10-2009-0059482 translation.*

* cited by examiner

*Primary Examiner* — Jacob S Scott
*Assistant Examiner* — Colby M Hansen

(57) ABSTRACT

A fluid clutch device having a fluid clutch in a body and a cover. A fan member is attached to the device. The body and fan member are both centered on the cover.

3 Claims, 2 Drawing Sheets

FLUID CLUTCH DEVICE

TECHNICAL FIELD

The invention relates to a fluid clutch device for driving a fan in a motor vehicle.

BACKGROUND

Fluid clutch devices having a fan impeller and a so-called viscous clutch, which are used for driving the fan impeller in motor vehicles, are known from the prior art. Said fluid clutch devices of the prior art have at least one centering facility by means of which the cover of the clutch is centered on the clutch housing and a further centering facility by means of which the fan impeller is centered on the cover or on the clutch body. This entails an increased machining and assembly expenditure for the individual components of the clutch device.

SUMMARY OF THE INVENTION

It is an object of the present invention to provide a fluid clutch device which permits simpler and cheaper machining and assembly of the individual components.

Said object is achieved by means of the features present invention which includes a fluid clutch device having a clutch body, a cover fastened to the body and a fan impeller fastened to the cover. The cover has a cylindrical surface which provides centering of the fan impeller on the cover.

The cylindrical surface on the cover can have first partial regions on the periphery with grooves to assist in the centering of the fan impeller. The cylindrical surface can also have second partial regions.

In the fluid clutch device according to the invention, a simplification of production and assembly is advantageously achieved in that both the clutch body and also the fan impeller are centered together on the cover of the clutch device.

BRIEF DESCRIPTION OF THE DRAWINGS

Further details, features and advantages of the invention will emerge from the following description of exemplary embodiments on the basis of the drawing, in which.

DESCRIPTION OF THE PREFERRED EMBODIMENTS

An embodiment of a fluid clutch device according to the invention will be described below with reference to a juxtaposition of FIGS. 1 and 2.

Figure 1:
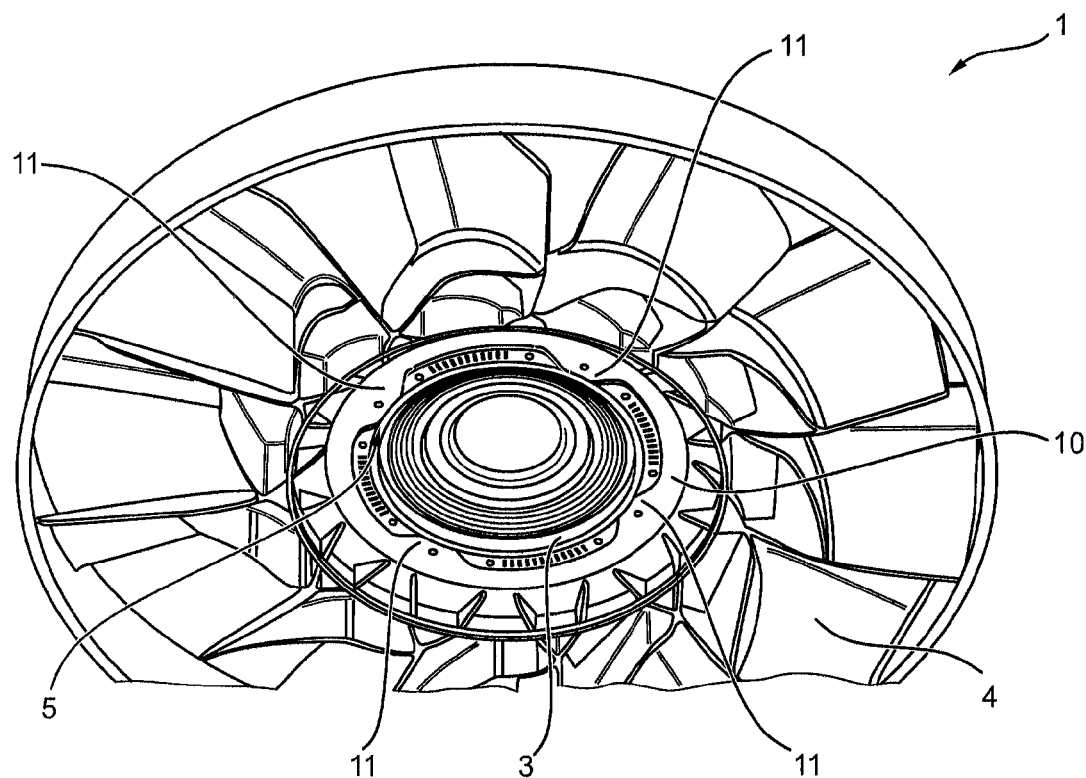
FIG. 1 shows a schematic perspective illustration of the fan impeller, which is centered on the cover, of the fluid clutch device according to one embodiment of the invention.

FIG. 1 shows a schematically simplified perspective illustration of an underside of an embodiment of a fluid clutch device 1, having a cover 3 and having a fan impeller 4, wherein in this illustration a clutch body 2 (see FIG. 2) has not yet been installed. The fan impeller 4 has an annular fastening flange 10, on the inner side of which is formed a multiplicity of projection regions 11 (four are illustrated here by way of example).

Figure 3A:
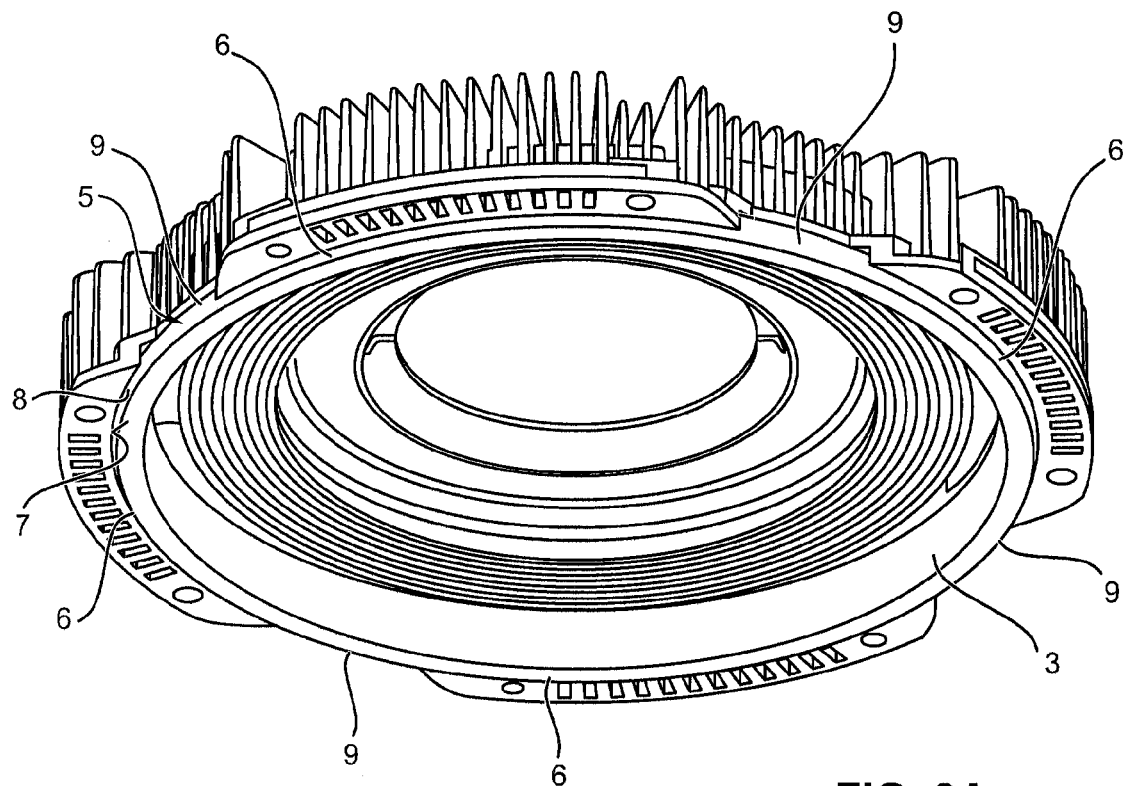
FIG. 3A shows a schematic perspective illustration of the underside of the cover of the fluid clutch device according to the invention.
Figure 3B:
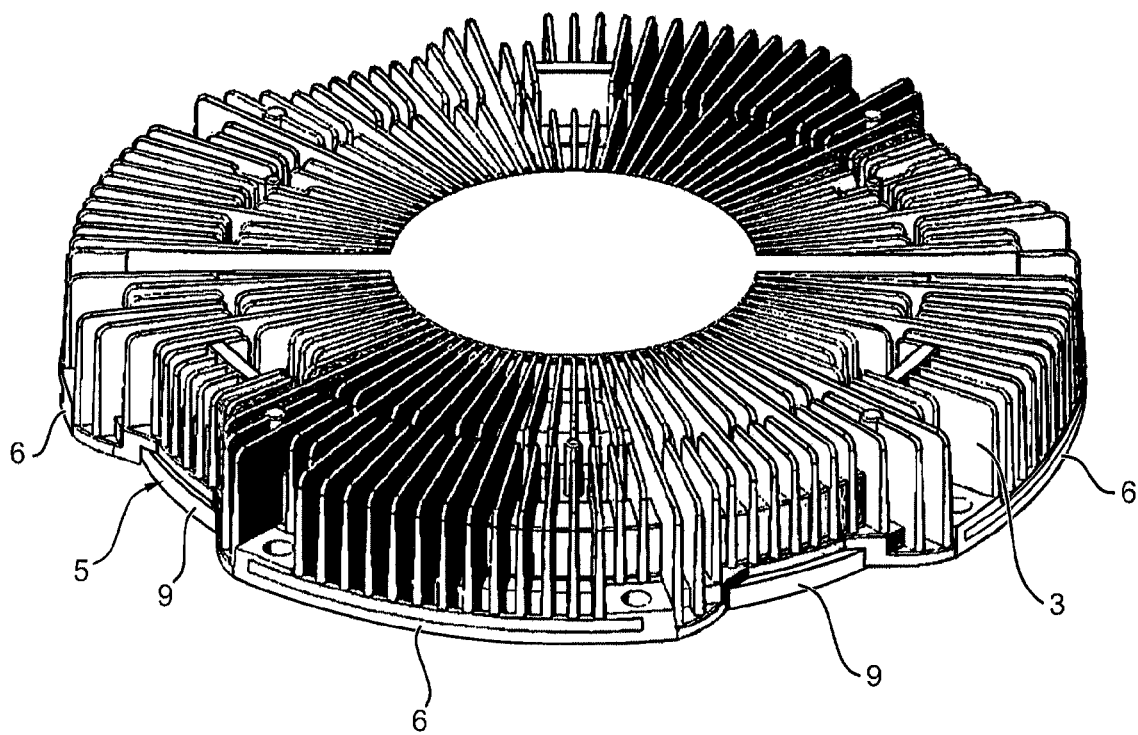
FIG. 3B shows a schematic perspective illustration of the top side of the cover of the fluid clutch device according to the invention.

As can be seen more clearly from the enlarged illustration of FIG. 3A, which shows an underside of the cover 3 which is preferably formed as a cast part, the cover 3 has a multiplicity of peripheral first partial regions 6 (four are illustrated here by way of example) which project radially outward. In each case one second partial region 9 is arranged on the periphery of the cover 3 between said first partial regions 6. Furthermore, the cover 3 has a cylindrical surface 5 which is produced by performing a machine processing operation on the cover 3. Said cylindrical surface 5 forms in each case one inner surface 7 of a groove 8 in the first partial regions 6, while the cylindrical surface 5 is an exposed outer lateral surface in the second partial regions 9, as can also be clearly seen from the image of a top side of the cover 3 in FIG. 3B. When the fan impeller 4 is fastened to the cover 3 (see FIG. 1), the projection regions 11 of the fan impeller 4 engage between the second partial regions 9 of the cover 3 and center the fan impeller 4 on the respective exposed cylindrical surface 5 of the second partial regions 9.

Figure 2:
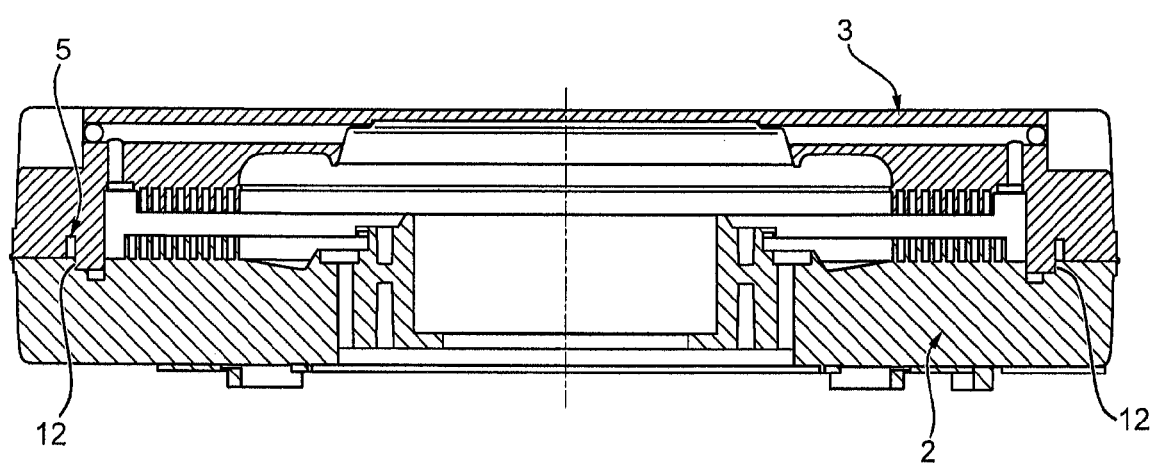
FIG. 2 shows a schematic partially sectional side view of the clutch body and the cover of the fluid clutch device.

FIG. 2 shows a schematically simplified, partially sectional side view of the clutch body 2 and of the cover 3 of the fluid clutch device 1 according to the invention. As can be seen from FIG. 2, the clutch body 2 is fastened to the underside of the cover 3. Here, projections 12 which are formed on the clutch body 2, and which are arranged on the periphery in each case correspondingly to the first partial regions 6 of the cylindrical surface 5, engage into the groove 8 formed in the first partial regions 6 and center the clutch body 2 by means of the inner surface 7 which forms the cylindrical surface 5 in said first partial regions 6. In this way, the clutch body 2 can be fastened to the cover 3 in a positioned manner.

In contrast to the prior art, it is possible in the fluid clutch device according to the invention for common centering of the fan impeller 4 and of the clutch body 2 to be achieved solely by means of the cylindrical surface 5 on the cover 3. Said surface 5 may furthermore be produced on the cover 3 by means of a single machine processing step. In this way, both simplified and cheap machining and also faster assembly of the components of the clutch device are made possible.

To supplement the disclosure, reference is made explicitly to the diagrammatic illustration of the invention in FIGS. 1 to 3B.

Although the invention has been described with respect to preferred embodiments, it is to be also understood that it is not to be so limited since changes and modifications can be made therein which are within the full scope of this invention as detailed by the following claims.

The invention claimed is:

1. A fluid clutch device (1) comprising:
   a clutch body (2);
   a fluid clutch positioned in the clutch body;
   a cover (3) which is fastened to the clutch body (2), and having a fan impeller (4) which is fastened to the cover (3);
   the cover (3) having a cylindrical surface (5) for centering both the clutch body (2) and the fan impeller (4);
   the cylindrical surface (5) being an outer lateral surface of the clutch body;
   the cylindrical surface (5) having a plurality of first partial regions (6) on its periphery, the first partial regions (6) having a groove (8) with an inner surface (7) on which the clutch body (2) is centered on the cover (3);
   the cylindrical surface (5) also having a plurality of second partial regions (9) on which the fan impeller (4) is centered on the cover (3), the cylindrical surface (5) being exposed in the second partial regions (9); and the first and second partial regions (6, 9) of the cylindrical surface (5) arranged in an alternating manner.

2. The fluid clutch device as set forth in claim 1 wherein the cylindrical surface (5) on the cover (3) is produced by performing a single machine processing operation.

3. The fluid clutch device as claimed in claim 1, wherein the cover (3) is formed as a cast part.

* * * * *